United States Patent [19]
Bates et al.

[11] Patent Number: 5,812,836
[45] Date of Patent: Sep. 22, 1998

[54] SYSTEM FOR PROCESSING ITERATIVE TASKS IN DATA PROCESSING SYSTEMS

[75] Inventors: Matthew Damien Bates, Winchester; Nicholas David Butler, Romsey; Malcolm Douglas Buttimer, Salisbury; Adrian Charles Gay, Fareham; Jong-Han Kim, Morden, all of England

[73] Assignee: International Business Machines Corporation, Armonk, N.Y.

[21] Appl. No.: 41,922

[22] Filed: Apr. 2, 1993

Related U.S. Application Data

[63] Continuation of Ser. No. 484,717, Feb. 23, 1990, abandoned.

[30] Foreign Application Priority Data

Feb. 27, 1989 [GB] United Kingdom ................... 8904413

[51] Int. Cl.$^6$ ...................................................... G06F 9/00
[52] U.S. Cl. ...................... 395/561; 364/262; 364/262.1; 364/262.4
[58] Field of Search .................................... 395/375, 120, 395/129, 140

[56] References Cited

U.S. PATENT DOCUMENTS

| | | | |
|---|---|---|---|
| 4,312,034 | 1/1982 | Gunter et al. ........................ | 395/375 |
| 4,677,573 | 6/1987 | Brown et al. ........................ | 395/143 |
| 4,701,847 | 10/1987 | Nichols ................................ | 364/200 |
| 4,730,261 | 3/1988 | Smith ................................... | 395/122 |
| 4,805,116 | 2/1989 | Liang et al. ......................... | 395/129 |
| 4,882,687 | 11/1989 | Gordon ................................ | 395/135 |
| 4,926,321 | 5/1990 | Sakamura ............................ | 395/425 |
| 5,046,023 | 9/1991 | Katsura et al. ...................... | 395/134 |

FOREIGN PATENT DOCUMENTS

| | | |
|---|---|---|
| 0213301 | 3/1987 | European Pat. Off. . |
| 1308024 | 2/1973 | United Kingdom . |
| 2204469 | 11/1988 | United Kingdom . |

OTHER PUBLICATIONS

Fine et al., "Pixel Processing With High–Speed Components", Nov. 1985, pp. 1–6.

*Primary Examiner*—Kevin J. Teska
*Assistant Examiner*—Ayni Mohamed
*Attorney, Agent, or Firm*—William A. Kinnaman, Jr.; Mark S. Walker

[57] ABSTRACT

A data processor comprises storage (e.g., registers) for each of first, second and third values, a processor condition register for processor condition codes, and logic for decoding instructions including a specific instruction defining an operation between the first value and either the second value or the third value, the selection of the second or the third value being made by the processor in dependence on the state of said processor condition code. The invention is of particular, but not exclusive, application for the plotting of lines in a display system. In an example of a display system incorporating such a data processor, a pixel can be plotted on each processor instruction cycle.

20 Claims, 4 Drawing Sheets

| SEQUENCER | PROCESSOR | PPL |
|---|---|---|
| DJO 0 | | |
| | SADD 0 | |
| DJO 1 | | DFSS 0 |
| | SADD 1 | |
| | | DFSS 1 |
| ⋮ | ⋮ | ⋮ |
| DJO n | | |
| | SADD n | DFSS n |

SYSTEM FOR PROCESSING ITERATIVE TASKS IN DATA PROCESSING SYSTEMS

This is a continuation of application Ser. No. 07/484,717 filed Feb. 23, 1990 now abandoned.

BACKGROUND OF THE INVENTION

1. Field of the Invention

The present invention relates to data processors and to the processing of iterative tasks in such processors.

The invention finds particular application in a pixel-based or raster-based display system which is able, among other things, to plot a line within a display field.

2. Description of the Related Art

In raster-based or pixel-based display systems, it is necessary to approximate lines in the form of arcs, and even vectors which are not in one of the major axial or diagonal directions. This is because a line to be plotted within a display field will, in the general case, only pass through pixel positions on the screen, plotter field and so on, which are too far apart to create the impression of a continuous line. In order to reduce the time it takes to approximate the points on a line, incremental algorithms have been developed which use integer arithmetic to plot successive points along a line. Examples of such algorithms are described in Foley and van Dam's book "Fundamentals of Interactive Computer Graphics", published in 1982 by Addison-Wesley Publishing Company. On pages 432 to 438 techniques for drawing straight lines are described and on pages 441 to 446 techniques for drawing other lines (e.g., circles and arcs).

These algorithms are generally of an iterative nature where each iteration involves updating an error term, the new value of which determines the action to be taken for the next pixel or pixels. In one well-known algorithm for plotting a straight line, which is usually known as the "Bresenham Line Algorithm", it is the sign of the result which determines the step direction. In a class of algorithms known as the Digital Differential Analyzer (DDA) algorithms, the carry of the result is used instead. There are similar algorithms for plotting lines other than straight ones, such as arcs.

The major disadvantage of all of these prior techniques is that there is a signficant amount of processing to be done for each point on the line. Conventionally, these incremental algorithms have involved the processing of a code loop with a plurality of instructions to determine the position of each pixel to be drawn with the result that, even with efficient algorithms of these types, a number of instruction cycles is needed to plot each pixel of a line. The time taken to carry out this processing (i.e., setup and algorithm execution time) creates a significant overhead, which limits the performance of the display system. As a complex graphics image may comprise many lines which need to be plotted, it can be seen that even with an efficient plotting algorithm, the approximation of lines on a display field can take a significant amount of time.

The need to reduce the plotting time of lines in a graphics display system has been recognized, and a line generator for a display system has been described in European patent application EP-A-301,253 which is effective in reducing the line generation time for short lines. In this published European application it is proposed to store coded representations of certain lines (especially shorter ones) in order to avoid the need for generating those lines each time one needs to be plotted. The technique described in this earlier application is useful for reducing the time for plotting short lines, where the setup time is significant, but does not present a general solution to reducing the time taken to plot lines in a graphics processing system.

A specific object of the invention is, therefore, to improve the line drawing performance of a display system. More generally, however, an object of the invention is to improve the performance of a data processor during iterative processing.

SUMMARY OF THE INVENTION

The essence of the invention is to provide an instruction defining an operation between a first value and either a second value or a third value, selected in dependence on the state of a processor condition code.

The provision of this instruction enables the processor of a display system to perform a calculation once per processor cycle time which previously required the execution of a bifurcated code loop. This instruction is fundamentally different from conventional conditional instructions which are used to control sequencing. Indeed, the new instruction avoids the need for program branching (i.e., for controlling sequencing) by directly causing an arithmetic or logical operation on a pair of operands selected from a set of operands by a condition code or codes.

Although the new instruction finds particular application in a display system for improving line drawing performance, it will be appreciated that it is of wider application in a general purpose data processor. It improves the performance of iterative processes where an operation needs to be performed between a first value and a selectable one of two other values in dependence on a processor condition being fulfilled.

In accordance with the invention, there is provided a data processor comprising means for storing each of first, second and third values, means for storing a processor condition code, logic for decoding instructions including a specific instruction defining an operation between the first value and either the second value or the third value, the selection of the second or the third value being made by the processor in dependence on the state of said processor condition code.

Preferably, the means for storing the second and third values are storage locations which have binary addresses which differ from one another by a single bit. In the preferred embodiment the second and third values are stored in adjacent storage locations.

Advantageously, the first, second and third values are stored in processor registers.

In an example of the invention described later, the specific instruction is a selective add instruction which specifies the selective addition of the first value and either the second value or the third value dependent on the state of said processor condition code. This example of the invention is incorporated in a display processor and enables lines to be plotted in a very efficient manner. In the particular example described, the processing of successive pixels on the line is based on Bresenham's Line Algorithm and the selection of the second or third value is dependent on the state of a sign flag. If, instead, the processing of successive pixels on the line were based on, for example, a DDA algorithm, the selection of the second or third value would be chosen to be dependent on the state of a carry flag.

A data processor in accordance with the invention may be incorporated in a data processing system which includes storage for instructions and an instruction sequencer responding to and executing sequencing instructions from said instruction storage for sequencing instructions for processing by the data processor.

The data processing system preferably includes task logic for performing tasks which is connected to receive and to execute task commands from the data processor, the task logic comprising control logic connected to receive a control signal from the data processor indicating that the data processor is executing said specific instruction and to cause the task logic to perform a preprogrammed particular task.

For selecting between a task command from the processor and a preprogrammed command simulating a task command for said particular task, a multiplexer can be provided which selects between a task command from the data processor and a preprogrammed command simulating a task command for said particular task, an output of the control logic controlling the multiplexer in response to the control signal from the data processor.

Advantageously, the data processor and the instruction sequencer and the task logic are arranged such that an instruction may be executed by the data processor concurrently with the execution of a sequencing instruction by the instruction sequencer or the performance of a task by the task logic.

As indicated above, the invention is of particular, but not exclusive, application for the plotting of lines in a display system. An example of a display system described later enables the processing of a pixel on each instruction cycle of the processor; the particular task performed by the task logic is an operation of draw a foreground or background pixel and select an axial or diagonal step within a display field for plotting successive pixels in the display field.

DESCRIPTION OF THE PREFERRED EMBODIMENT

Figure 1:
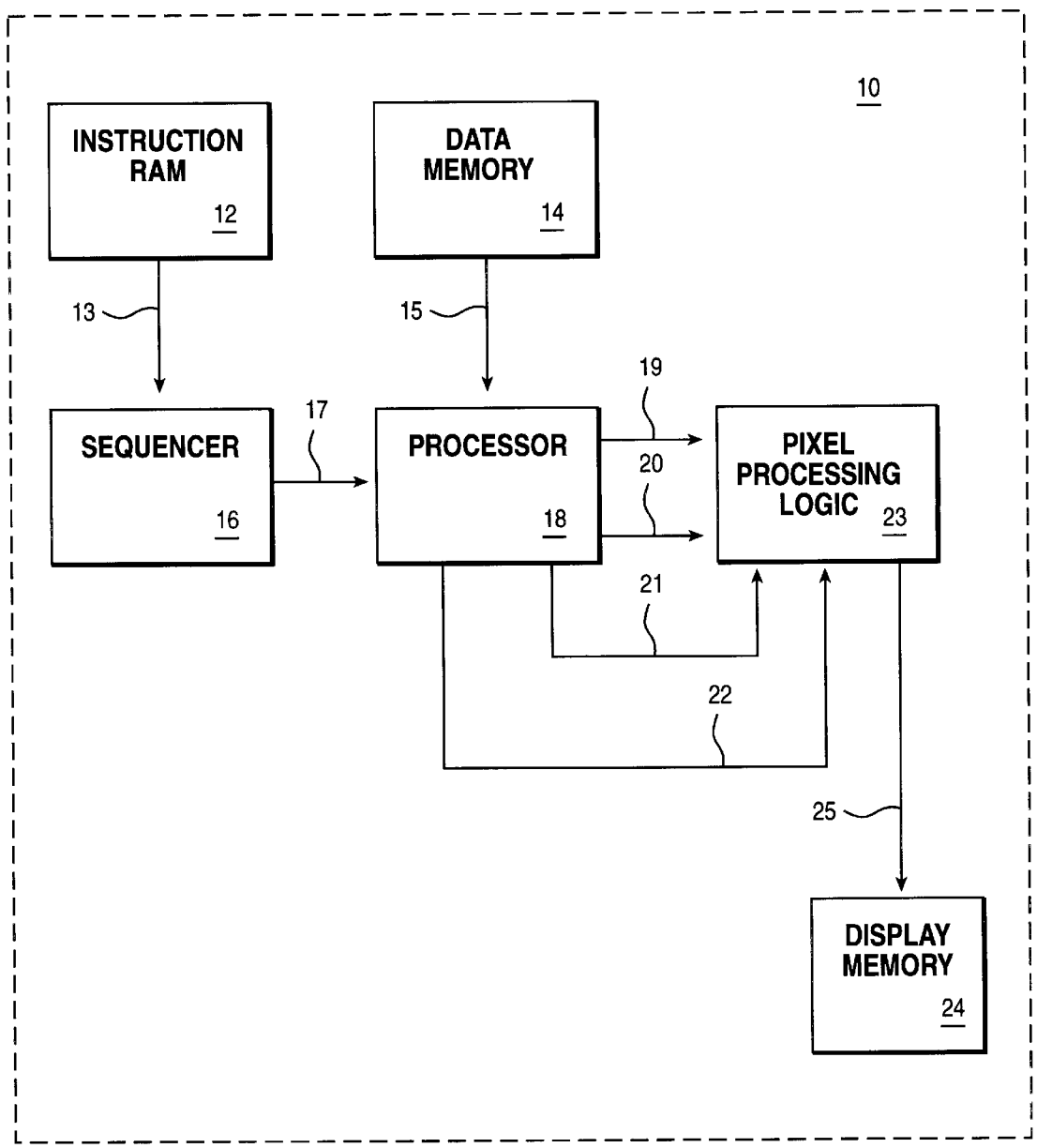
FIG. 1 is a block diagram of an application of an example of the invention as implemented in a display processing system.

A specific example of the present invention will now be described which is based on a prior technique for generating a straight line which is known as Bresenham's Line Algorithm. This prior technique is described on pages 433 to 436 of Foley and van Dam's book, referred to above, and in an article by J. E. Bresenham entitled "Algorithm for Computer Control of Digital Plotter", which was published on pages 25 to 30 of the IBM Systems Journal, Vol. 4, No. 1, in 1965. It will be appreciated from the following that the invention is also applicable to other incremental techniques whether for drawing straight lines or other lines such as curves, or indeed for other iterative processes in general.

Bresenham's Line Algorithm is defined for lines starting at the origin and extending away therefrom within the first octant of a coordinate system. Lines in the remaining octants can be computed using Bresenham's Line Algorithm by normalization such that the equivalent line within the first quadrant is computed and the results of the algorithm are transposed using the symmetry of the coordinate space to the actual position in space of the line to be drawn. Bresenham's algorithm assumes that the starting and finishing points of the lines are given in terms of pixel positions. The algorithm then enables the individual pixel positions which are to be used to represent the line to be computed.

The core of the Bresenham's Line Algorithm (as implemented by a conventional prior art computer program) for plotting successive pixel points on a straight line comprises extract of code in Table 1 for computing the successive x,y coordinates of the individual pixels. The basic bifurcated code loop which is illustrated employs two parallel paths, one of which is chosen dependent on the state of the negative ALU status flag, 'n'.

TABLE 1

| 1 | loop: | CJP | n,negin | Jump to label if negative flag set. |
| 2 | | ADD | R1,R2 | Add constant K1 to error term in R1. |
| 3 | | PLOT | pixel at . . . | |
| 4 | | CDJ | a,loop | Return to "loop" and repeat for next pixel. |
| 5 | negin: | ADD | R1,R3 | Add constant K2 to error term in R1. |
| 6 | | PLOT | pixel at . . . | |
| 7 | | CDJ | a,loop | Return to "loop" and repeat for next pixel. |

At each stage in the plotting process the program has to add a selected augend (K1 or K2) depending on the state of one of the processor flags (here the negative sign flag n). If the negative sign flag is set at step 1, the program sequencer jumps to the flag "negin" and adds (at step 5) the constant K2 from a register R3 to the content of the register R1; the negative sign flag will be updated automatically by the processor in the normal way. At step 6 the pixel is plotted and then control returns from step 4 to the flag "loop".

If the negative sign flag is not set at step 1, the processor adds (at step 2) the constant K1 from a register R2 to the content of the register R1; the negative sign flag will be updated automatically by the processor in the normal way. At step 3 the pixel is plotted and then control returns from step 4 to the flag "loop".

It can be seen, therefore, that this bifurcated loop comprises seven instructions, four of which have to be sequenced each iteration in order to plot the successive points on a line.

The invention provides a new instruction which can be used to avoid the two paths within such a loop, thereby improving performance (significantly in short code paths) at no cost.

In order to improve Bresenham's Line Algorithm, a processor (e.g., a display processor) in accordance with the invention is capable of performing a new type of instruction which we shall term here a "Selective Add" (SADD) instruction. The Selective Add (SADD) instruction differs from a normal Add in that it effectively has three operands, although only two are named in the instruction and two are used in execution. The two operands named in the instruction are the augend and the first of two possible addends (normally contained in the even of an implied even/odd register pair). The two operands used in execution are the augend and one of the two possible addends, the selection of which addend is to be used being determined dynamically by the current setting of the negative ALU status flag.

Thus "SADD R1,R2" has the effect of: R1 becomes equal to R1 plus R2 if the negative ALU flag is reset; and R1 becomes equal to R1 plus R3 if the negative ALU flag is set. The SADD instruction therefore avoids the overhead of branching on the ALU status flag required by the code shown in Table 1.

FIG. 1 is a block diagram illustrating the information flow in a display processing system 10 incorporating the invention.

A sequencer 16 sequences through instructions received via an instruction path 13 from an instruction random access memory (RAM) 12. The sequencer 16 decodes sequencing instructions such as decrement and jump on overlap instructions and generally controls the sequencing of the instructions in the instruction RAM 12. Instructions other than sequencing instructions are passed to a processor 18 via a further instruction path 17 for execution. The processor 18 has access to a data memory 14 via a data path 15 for data used in executing the instruction received over the path 17. The processor 18 is in turn connected to task processing logic in the form of pixel plotting logic 23 via address lines 19 and control lines 20–22. The pixel plotting logic 23 performs pixel drawing functions for updating the pixel data in a display memory 24 via path 25.

It should be noted that the separation of the blocks in FIG. 1 is for ease of understanding and that other configurations of physical units in the display processing system 10 are possible. For example, although the instruction RAM 12, the data memory 14 and the display memory 24 are shown as separate units, they could in practice be implemented by configuring general purpose storage.

Figure 2:
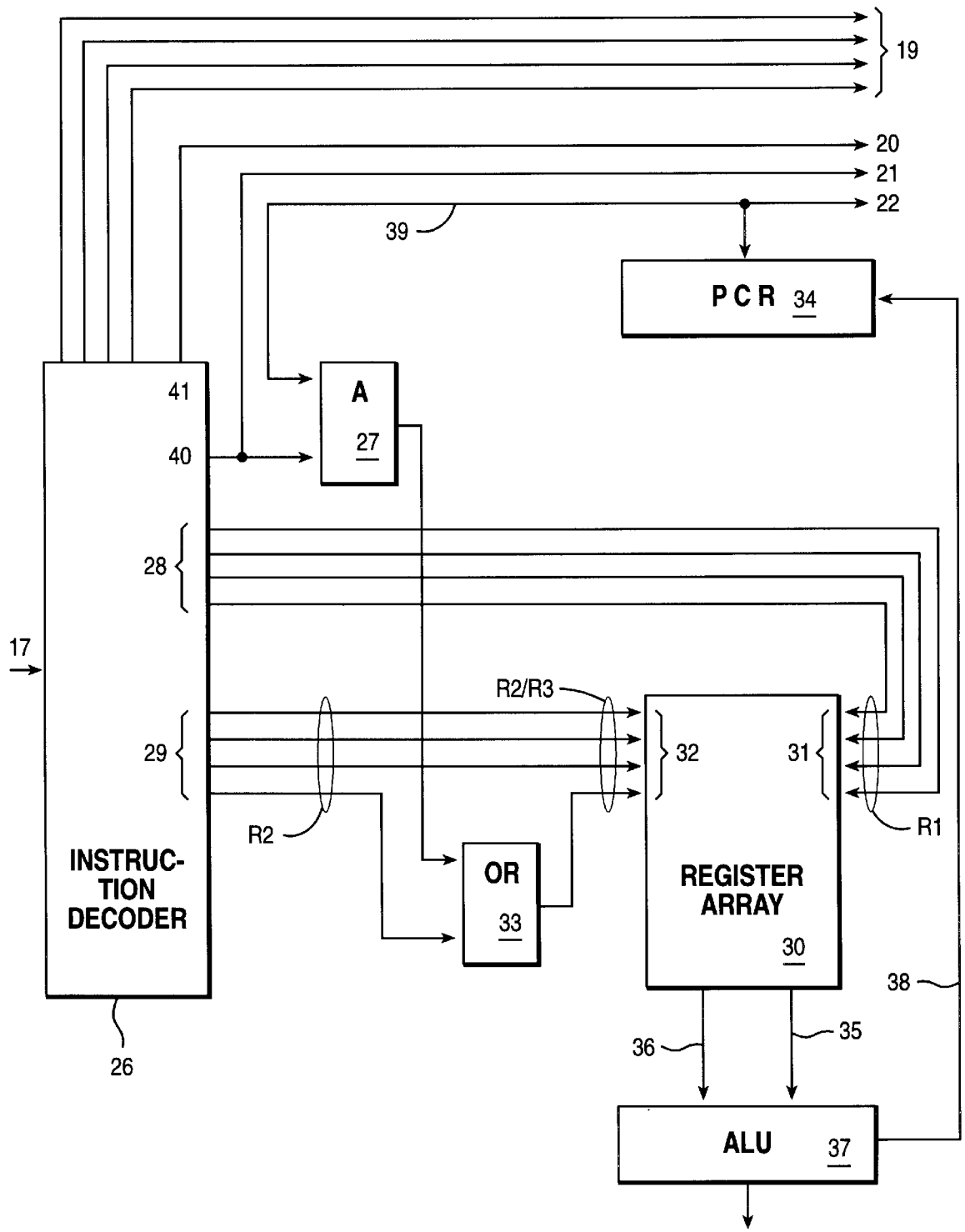
FIG. 2 is a block diagram of the processor of the system shown in FIG. 1.

FIG. 2 is a diagram of the logical structure of the processor 18 of FIG. 1. Only those aspects of the structure which are needed for an understanding of the invention are illustrated. The instruction arrives in the data path 17, which in practice comprises a plurality of lines, and is decoded by an instruction decoder 26. The instruction decoder is able to decode many instructions, but the instruction of interest here is the Selective Add (SADD) instruction. The SADD instruction comprises an operation code and two register addresses R1 and R2. When the SADD instruction is decoded a SADD decode signal is generated at decoder output 40 to an AND gate 27 and the two register addresses R1 and R2 are supplied on address lines 28 and 29. The lines 28 are connected directly to a first address input port 31 for a general purpose register array 30. The high-order bit lines of the lines 29 are applied directly to a second address input port 32 to the register array 30. The lowest-order bit line of the lines 29 passes via an OR gate 33 to the lowest-order input of the input port 32. The second input of the OR gate 33 is taken from the output of the AND gate 27. The second input of that AND gate 27 is received via path 39 from the sign flag of a condition register in the processor condition registers (PCR) 34.

In this example, the SADD instruction specifies as register addresses the addresses R1 and R2 on the lines 28 and 29 respectively, the address of register R2 being chosen to be an even register address.

If, then, the sign flag of the condition register is set negative, the combination of the SADD decode signal from the decoder output 40 and the set sign flag causes the output of the AND gate 27 to go high and the output of the OR gate 33 to be logical 1 (for an odd address), even though the lowest bit from the SADD instruction was for an even address. In this way the R2 address from the SADD instruction is modified to the address of register R3.

When the sign flag is not set (i.e., the sign condition is positive) then the output of the AND gate 27 is low and the output of the OR gate 33 reflects the value from the SADD instruction. In other words, in this case the R2 address from the SADD instruction is not modified.

The contents of the selected registers (R1 and either R2 or R3) are supplied over lines 35 and 36 to the Arithmetic Logic Unit (ALU) 37, where, in this example of the invention, they are added together. The processor condition registers 34 are updated in response to the ALU operations in a conventional manner as indicated by the path 38. The output of the ALU 37 determines the new error term for the next iteration and will be stored in R1. The processor also supplies the following to the pixel plotting logic: the state of the sign flag on line 22 from the PCR 34; the SADD decode signal on line 21 from the decoder output 40; an I/O select signal on line 20 from an output 41 of the decoder 26; and a pixel plotting logic command code on lines 19 from the instruction decoder 26.

It will be appreciated that the processor 18 includes other control lines of a conventional nature for controlling the operation of the processor elements, and for executing instructions other than SADD. However, these are not required for an understanding of the invention and are consequently omitted for reasons of clarity.

Figures 3, 4:
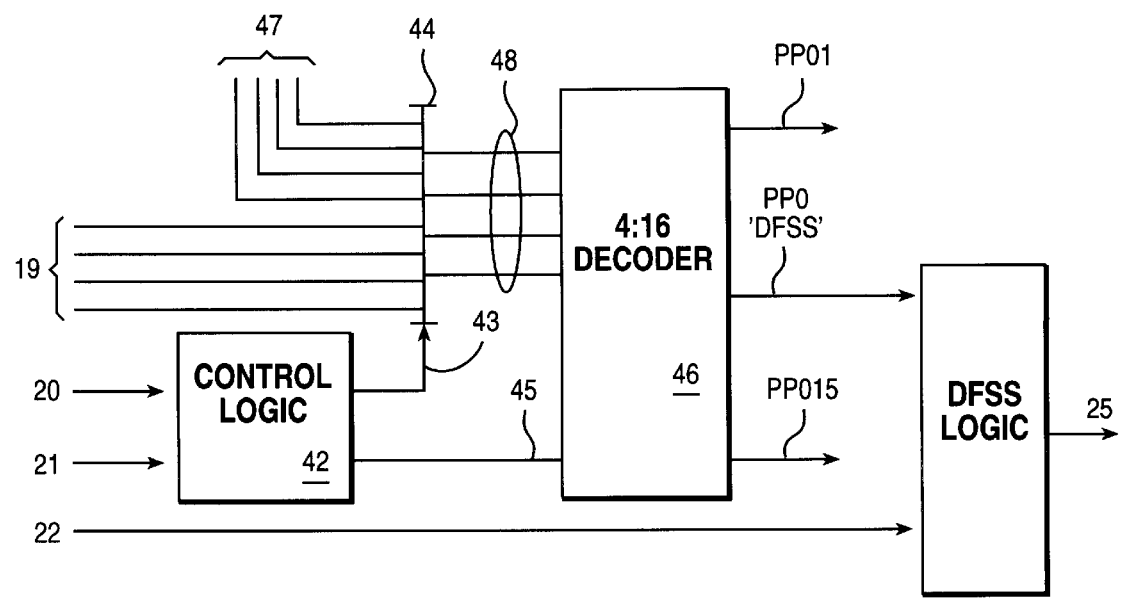
FIG. 3 is a block diagram of the pixel processing logic of the system shown in FIG. 1.
FIG. 4 illustrates the overlapping of operations in elements of the display processing system of FIG. 1.

FIG. 3 illustrates the flow of data through the pixel plotting logic 23.

In response to a SADD decode signal on line 21 and an I/O select signal on line 20 from the processor 18, control logic 42 causes an enable signal to be supplied on a line 45 to a decoder 46 and a switch signal to be supplied to a 2:1 multiplexer 44 for causing a forced address 47 specifying a "DFSS" (Draw Foreground/background pixel and Select axial/diagonal Step) instruction to be selected rather than the address signal supplied on the address lines 19 from the processor 18.

If the processor is processing an instruction other than SADD, then the address on the lines 19 is used to address the decoder 46. However, in the case of the SADD instruction, by means of the forced address from 47 (which can be generated by hardwiring the address lines) a DFSS instruction is effectively simulated in hardware.

By the above structure, normal Pixel Plotting Operations (PPOs) can be controlled by I/O instructions from the processor 18 via the local I/O bus 19 to which the pixel plotting logic 23 is attached. The selection of the operations PP01–PP015 to be performed by the pixel plotting logic is determined by decoding the address at the input to the decoder 46. The control logic 42, on detecting when the processor is executing a SADD instruction from the SADD decode signal on line 20, causes the pixel interface to simulate a processor DFSS I/O instruction by selecting the forced address for a DFSS instruction. In response to this, the decoder 46 outputs a signal on a line PPO"DFSS" for causing DFSS logic to perform display the pixel and to increment or step the display field position. The DFSS logic also receives the sign flag on the line 22 from the processor condition register 34. If the sign flag is set, indicating a negative sign, then the pixel position is not incremented and the pixel position is stepped. If the sign flag is not set, indicating a positive sign, then the pixel position is stepped and incremented.

The DFSS logic is not illustrated in detail as this can be implemented in suitable special-purpose logic for addressing and modifying the content of the display memory 24 via the path 25. The details of this logic are not necessary for an understanding of the invention and depend on details of the implementation of the display memory 24 and the control of the display device, be it a display screen, a plotter, printer, etc.

One of the instructions which can be performed by the sequencer is a "DJO" (Decrement and Jump with Overlap) instruction. After decrementing the loop counter and testing for the end of the loop the instruction branches to the target address. The next instruction in the pipeline can be concurrently executed by the processor 18. The sequencer, the processor and the pixel plotting logic effectively act as an instruction pipeline with instruction overlap as shown in FIG. 4.

The display processing system 10 described above enables a pixel to be plotted in the display memory 24 each instruction cycle for drawing a line using the extract of code in Table 2, which is the core loop of an algorithm that executes a loop n times where n is the length of the line in pixels.

TABLE 2

| DJO  | loop  | loop but overlap the next instruction |
|------|-------|---------------------------------------|
| SADD | R1,R2 | selectively add R1 to R2/R3           |

The three elements formed by the sequencer 16, processor 18 and the pixel plotting logic 23 enable one pixel to be plotted each instruction cycle, as illustrated in FIG. 4, with the sequencer 16 executing the DJO instruction, the processor 18 executing the SADD instruction, and the pixel plotting logic 23 automatically executing a simulated DFSS instruction in response to the processor execution of the SADD instruction.

In the example of the invention as described above, a line can be plotted using a technique based on Bresenham's algorithm by starting at one of the end points of the line and then stepping along the line, each step being reduced to a move in the axial direction or the appropriate diagonal direction.

Figure 5:
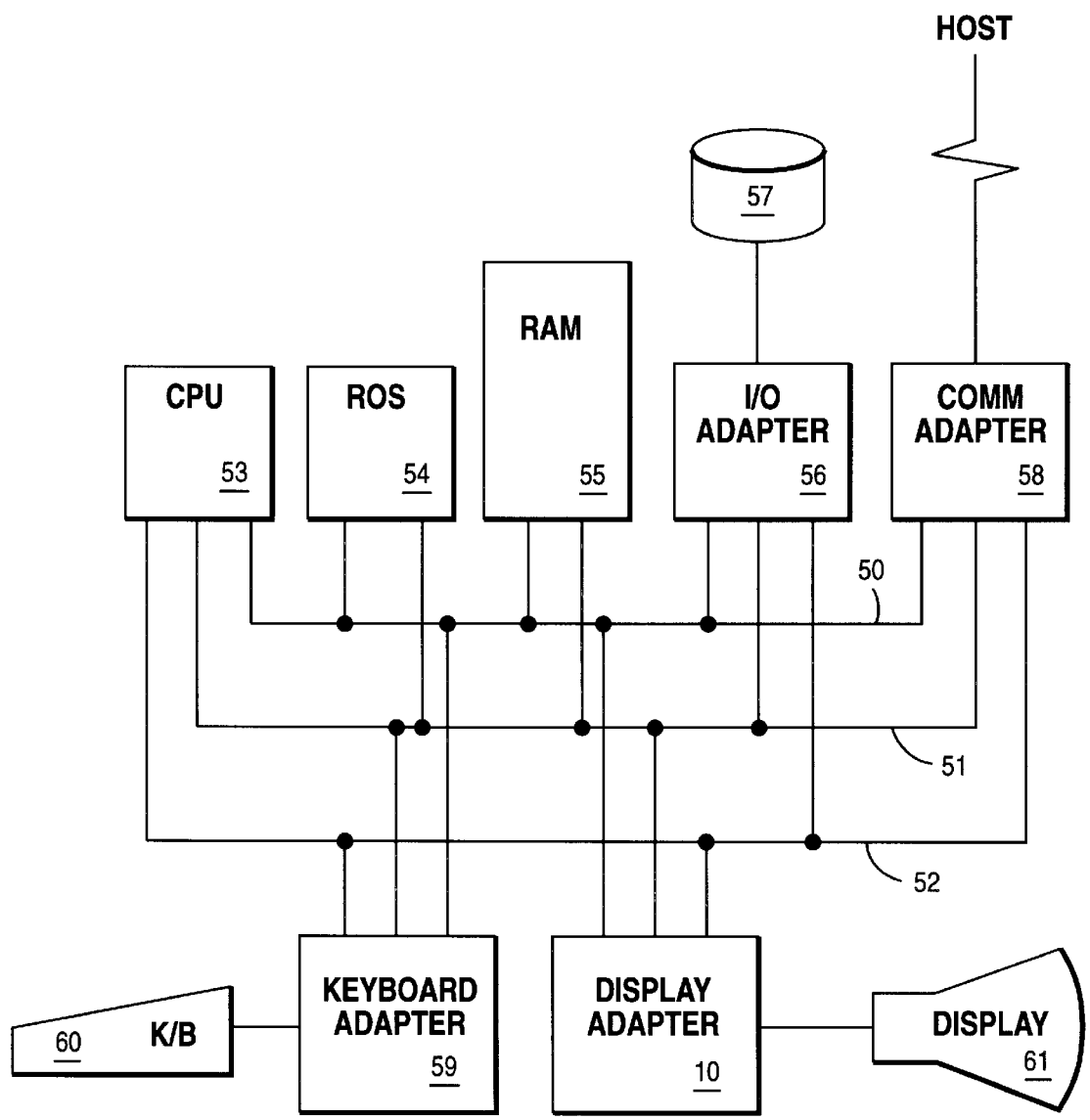
FIG. 5 is a block diagram of a workstation in which the display processing system of FIG. 1 may be incorporated.

FIG. 5 illustrates a workstation in which the display processing system of FIG. 1 is incorporated as a display adapter 10. The workstation comprises a central processing unit (CPU) 53 in the form of a conventional multitasking processor and a number of other units including the display adapter 10 connected thereto via a system bus. The system bus comprises a data bus 50, an address bus 51 and a control bus 52. Connected to the system bus are a random access memory (RAM) 55 and a read only store (ROS) 54. An I/O adapter 56 is provided for connecting the system bus to peripheral devices 57 such as disk units. Similarly, a communications adapter 58 is provided for connecting the workstation to external processors (e.g., a host computer). A keyboard 60 is connected to the system bus via a keyboard adapter 59. The display adapter 10 is used for controlling the display of data on a display device 61.

Although a particular example of the invention has been described, it will be appreciated that modifications and additions are possible within the scope of the invention.

For example, because the SADD and DFSS are primitive instructions this technique is equally applicable to other incremental line drawing algorithms such as DDA algorithms. In the case of a DDA algorithm, as the determining factor for selecting the stepping direction is the carry flag rather than the sign flag, the carry flag could be selected from the processor condition register rather than the sign flag.

It should be noted that the invention is equally applicable to incremental line drawing algorithms for lines other than straight ones, such as curves and arcs. By considering other instructions, other combinations of the processor condition codes and other drawing primitives this mechanism can be applied to most incremental and DDA algorithms. For example, one method of circle drawing requires the sign condition code and the zero condition code, and drawing primitive that draws a pixel and steps in one of three directions. Thus the selection of operands could be dependent on a plurality of condition codes. In the same way, the selection of two operands from three is the minimum selection requirement; in general a selection of n from m is possible where n>2 and m>n.

Indeed, it will be appreciated that the invention is applicable generally to processing incremental algorithms, not just to the processing of incremental line drawing algorithms in a display processor.

While the invention has been particularly shown and described with reference to preferred embodiments thereof, it will be understood by those skilled in the art that various changes in form and details may be made therein without departing from the spirit and scope of the invention.

What is claimed is:

1. A processor comprising:
   means for storing a plurality of values at addressable storage locations;
   means for storing a processor condition code; and
   logic for decoding instructions from a sequence of stored instructions, said instructions including a specific instruction defining an operation between a first value at a first address specified by said instruction, and a second value at a second addressable storage location, the second addressable location determined from a second address specified in said instruction and the state of said processor condition code.

2. A processor as claimed in claim 1 wherein the means for storing the plurality of values are addressable storage locations which have binary addresses which differ from one another by a single bit.

3. A processor as claimed in claim 1 comprising a plurality of registers, said plurality of values being stored in said registers.

4. A processor as claimed in claim 1 wherein the specific instruction is a selective add instruction which specifies the selective addition of the first value and the second value selected from either a second addressable value or a third addressable value dependent on the state of said processor condition code.

5. A processor as claimed in claim 1 wherein said processor condition code is a sign flag.

6. A processor as claimed in claim 1 wherein said processor condition code is a carry flag.

7. A processing system comprising a data processor as claimed in claim 1.

8. A data processing system as claimed in claim 7 comprising storage for instructions and an instruction sequencer responding to and executing sequencing instructions from said instruction storage for sequencing instructions for processing by said processor.

9. A processing system as claimed in claim 8 wherein the data processor and the instruction sequencer are arranged such that an instruction may be executed by the processor concurrently with the execution of a sequencing instruction by the instruction sequencer.

10. A data processing system as claimed in claim 7 comprising task logic for performing tasks, the task logic being connected to receive and execute task commands from the processor, the task logic comprising control logic connected to receive a control signal from the processor indicating that the processor is executing said specific instruction, the control logic causing the task logic to perform a preprogrammed particular task.

11. A data processing system as claimed in claim 10 wherein the task logic includes a multiplexer for selecting between a task command from the processor and a preprogrammed command simulating a task command for said particular task, an output of the control logic controlling the multiplexer in response to the control signal from the processor.

12. A data processing system as claimed in claim 10 wherein the processor and the task logic are arranged such that a task may be performed by the task logic concurrently with the execution of an instruction by the processor.

13. A data processing system as claimed in claim 10 in the form of a display processing system, the particular task performed by the task logic being a pixel plotting operation.

14. A data processing system as claimed in claim 13 wherein the pixel plotting operation is an operation of draw a foreground or background pixel and select an axial or diagonal step within a display field for plotting successive pixels for simulating a line in said display field.

15. Processing apparatus comprising:
   means for fetching instructions from storage for decoding and execution, said instructions including a specific instruction defining an operation between a first operand comprising a first addressable value and a second operand comprising either a second addressable value or a third addressable value depending on a processor condition code; and
   means for decoding the instructions fetched from storage by said fetching means, said decoding means decoding said specific instruction by selecting an address of one of said second and third addressable values as said second operand based on said condition code.

16. Apparatus as claimed in claim 15 in which said second and third values are stored at addressable locations having binary addresses that differ from each other by a single bit at a predetermined bit location thereof.

17. Apparatus as claimed in claim 16 in which said decoding means selects said second operand by using said condition code to generate an address bit at said predetermined bit location.

18. Apparatus as claimed in claim 15 in which said specific instruction includes an operation code and pointers to said first and second addressable values.

19. Apparatus as claimed in claim 15, further comprising:
   means for executing the instructions decoded by said decoding means, said means executing said specific instruction by performing said operation between said first value as a first operand and the selected one of said second and third values as a second operand.

20. Apparatus as claimed in claim 15, further comprising means for storing said instructions.

\* \* \* \* \*

UNITED STATES PATENT AND TRADEMARK OFFICE
CERTIFICATE OF CORRECTION

PATENT NO : 5,812,836
DATED : Sept. 22, 1998
INVENTOR(S): Bates, et al

It is certified that error appears in the above-identified patent and that said Letters Patent is hereby corrected as shown below:

Column 8, line 54, please delete "A processing" and insert --A data processing-- therefor.

Column 8, line 54, please delete "a data processor" and insert --a processing-- therefor.

Column 8, line 61, please delete "A processing" and insert --a processor-- therefor.

Signed and Sealed this

Second Day of November, 1999

Attest:

Q. TODD DICKINSON

Attesting Officer

Acting Commissioner of Patents and Trademarks